US006227774B1

(12) United States Patent
Haughton et al.

(10) Patent No.: US 6,227,774 B1
(45) Date of Patent: May 8, 2001

(54) SPADE DRILL BIT

(75) Inventors: Keith Louis Haughton, Midland; Glenn Wallace Haughton, Toronto, both of (CA)

(73) Assignee: Tetrason Diversified Corp., Toronto (CA)

( * ) Notice: Subject to any disclaimer, the term of this patent is extended or adjusted under 35 U.S.C. 154(b) by 0 days.

(21) Appl. No.: 09/339,181

(22) Filed: Jun. 24, 1999

(51) Int. Cl.$^{7}$ .................................................... B23B 51/02
(52) U.S. Cl. ........................... 408/225; 408/227; 408/228
(58) Field of Search ..................................... 408/211, 214, 408/225, 228, 230, 227, 224

(56) References Cited

U.S. PATENT DOCUMENTS

| | | |
|---|---|---|
| 124,089 | 2/1872 | Shepardson . |
| 764,664 | 7/1904 | Jones . |
| 2,543,206 | 2/1951 | Smith . |
| 2,627,292 | 2/1953 | Kronwall . |
| 2,681,673 | 6/1954 | Mackey . |
| 2,689,131 | 9/1954 | Priest . |
| 2,692,627 | 10/1954 | Sterns . |
| 2,782,824 | 2/1957 | Robinson . |
| 2,794,468 | 6/1957 | Huxtable . |
| 3,543,820 | 12/1970 | Tulumello . |
| 3,920,350 | 11/1975 | Southall . |
| 3,966,350 | 6/1976 | Benjamin . |
| 3,997,279 | 12/1976 | Porter . |
| 4,017,202 | 4/1977 | Townsend . |
| 4,050,841 | 9/1977 | Hildebrandt . |
| 4,064,784 | 12/1977 | Adler . |
| 4,066,379 | 1/1978 | Prohaska . |
| 4,079,766 | 3/1978 | Conley et al. . |
| 4,120,601 | 10/1978 | Benjamin . |
| 4,222,690 | 9/1980 | Hosoi . |
| 4,257,307 | 3/1981 | Regensburger . |
| 4,285,620 | 8/1981 | Luebbert et al. . |
| 4,286,904 | 9/1981 | Porter et al. . |
| 4,330,229 | 5/1982 | Croydon . |
| 4,480,951 | 11/1984 | Regensburger . |
| 4,527,449 | 7/1985 | Sydiowski et al. . |
| 4,625,593 | 12/1986 | Schmotzer . |
| 4,682,917 | 7/1987 | Williams, III et al. . |
| 4,725,175 | 2/1988 | Jesson . |
| 4,753,558 | 6/1988 | Jansson . |
| 4,844,670 | 7/1989 | Heule . |
| 4,878,786 | 11/1989 | Hedgepeth . |
| 4,906,146 | 3/1990 | Bowling . |
| 4,950,111 | 8/1990 | Thomas . |
| 5,061,127 | 10/1991 | Thomas . |

(List continued on next page.)

FOREIGN PATENT DOCUMENTS

| | | |
|---|---|---|
| 2421022 | 10/1979 | (FR) . |
| WO9906193 | 2/1999 | (WO) . |

*Primary Examiner*—David W. Howell
(74) *Attorney, Agent, or Firm*—Nancy E. Hill; Hill & Schumacher

(57) ABSTRACT

A spade drill bit for use in association with a drill having a direction of rotation includes an elongate shank, a spade portion and a center spur. The elongate shank portion has a central longitudinal axis and one end adapted to engage the drill. The spade portion extends longitudinally from the other end of the elongate shank. The spade portion has opposed spaced apart planar faces and each planar face has a leading shoulder edge and a trailing shoulder edge. Each planar face has a leading face portion and a trailing face portion proximate to the respective leading shoulder edge and trailing shoulder edge that are twisted in the direction of rotation. The center spur extends outwardly from the spade portion along the central longitudinal axis. Preferably the center spur has an elongate flute that has a volume that increases toward the spade portion. Preferably a dimple is formed proximate to a corner leading edge which is between the leading shoulder edge and the leading longitudinal edge.

22 Claims, 9 Drawing Sheets

U.S. PATENT DOCUMENTS

| | | | | |
|---|---|---|---|---|
| 5,145,018 | | 9/1992 | Schimke et al. . | |
| 5,193,951 | | 3/1993 | Schimke . | |
| 5,221,166 | | 6/1993 | Bothum . | |
| 5,286,143 | | 2/1994 | Schimke . | |
| 5,433,561 | * | 7/1995 | Schmike | 408/225 |
| 5,452,970 | * | 9/1995 | Sundstrom et al. | 408/225 |
| 5,697,738 | * | 12/1997 | Stone et al. | 408/225 |
| 5,700,113 | * | 12/1997 | Stone et al. | 408/214 |

* cited by examiner

SPADE DRILL BIT

FIELD OF THE INVENTION

This invention relates to drill bits for forming bores in wood or other soft material and in particular this invention relates to spade type drill bits that range in size from about ¼" to 1½" and that are commonly used with a small portable electric or cordless drill or with a drill press.

BACKGROUND OF THE INVENTION

Drill bits are a very common tool used in the construction and maintenance industries. There are a wide variety of drill bits that have been developed. Spade type drill bits, which have a spade-like blade or cutter, are generally used in association with small portable electric or cordless drills but they may also be used in association with a dill press.

Spade drill bits are generally inexpensive as compared to auger or twist type drill bits. One of the reasons that spade drill bits are affordable is their simple design and manufacture. A spade drill bit is made by flattening a portion of a cylindrical bar by forging and the formation of cutting edges on the flattened section by grinding. The remainder of the unflattened bar is used to engage the drill by way of a chuck. In addition the spade drill bit may be modified through secondary forging steps thereby modifying the flattened section to include performance improving impressions, for example folds, grooves and bends.

Other attributes of spade drills over auger or twist type drills include convenience of storage and ease of resharpening the bits in the field.

In general, spade type drills have a shank region of cylindrical cross section. The end of the shank section may have either ground or forged flats to assist engagement of the drill in the chuck of the portable electric or cordless drill or drill press. The flattened end of the spade drill has two parallel opposing planar face regions, each having a leading face portion and a trailing face portion and an axially extending centre spur that points away from the shank end of the spade. The centre spur extends between the opposing planar face regions of the spade bit. Each opposing face of the spade is bounded by leading and trailing longitudinal edges, by leading and trailing shoulder edges and by leading and trailing shank edges.

The longitudinal sides between the longitudinal edges are slightly tapered toward each other toward the shank end of the bit, further, the longitudinal sides occur at an acute angle from the face region of the spade drill along the leading longitudinal edge.

The shoulder sides are generally radially located between the centre spur and the longitudinal sides and are sloped so as to occur at an acute angle from the face region of the spade drill along the leading shoulder edge.

As the leading and trailing shank edges of the spade are removed from all cutting activity, the side located between these edges is left unfinished beyond the as forged condition.

The centre spur has centre spur faces that are bounded by the face region of the spade drill and by leading and trailing centre spur edges, between the leading and trailing edges are the centre spur sides, the sides occurring at an acute angle from the centre spur faces along the centre spur leading edges.

The centre spur sides, longitudinal sides and shoulder sides occur at acute angles from their respective faces to provide relief for the centre spur leading edge, longitudinal leading edge and shoulder leading edge respectively during operation of the drill.

Additionally, side spurs are often provided. These spurs generally are extensions of the longitudinal sides extending beyond the shoulder sides and have leading and trailing faces that are continuations of the leading face portion and trailing face portions respectively of the face region of the spade. Further the inward side of the side spur Is a non-coplanar extension of the shoulder side of the spade drill.

In operation, with the spade drill bit installed in an electric or cordless drill or drill press the centre spur is the first part of the bit to engage the work whereupon the centre spur leading edges cut out a conical impression in the work initiating cutting and providing stability for the spade drill. Further advancement of the drill allows the side spurs, if present, to cut a circular "v" shaped groove in the work whereupon further advancement causes the shoulder side leading edges to engage the work and remove material between the centre spur and side spur. This action continues until the centre spur exits out the other side of the workpiece and the side spurs cut a circular exit hole. During cutting action where the longitudinal sides are engaged with the workpiece and particularly upon break through of the centre spur and side spurs from the workpiece, the longitudinal sides provide stability of the bit in the formed bore.

A review of the prior art reveals that considerable effort has been taken to provide increased cutting efficiency of the spade drill at all of the cutting edges.

For example U.S. Pat. No. 2,782,824 issued to Robinson on Feb. 26, 1957, shows a groove in the centre spur face along a side of the centre spur leading edge. However, the inside edge of the centre spur flute is generally parallel to the centre spur leading edge and there is not an increase in volume of the flute in the longitudinal direction. Alternatively, U.S. Pat. No. 3,997,279 issued to Porter on Dec. 14, 1976 shows a full centre spur flute that has concave sides proximate to the centre spur leading edge and the centre spur trailing edge. The concave sides extend from the tip to the face of the spade drill bit. However, there is a considerably reduced amount of material in this centre spur which leads to an increased likelihood of failure.

An alternate prior art spade drill bit disclosed in U.S. Pat. No. 4,682,917 issued to Williams on Jul. 28, 1987, shows a groove in the face of the spade along a side of the shoulder leading edge with side spurs extending in the direction of the centre spur. In addition, the leading face of the side spur is sloping in the direction of rotation.

Despite these and many other improvements to spade drills there still remain deficiencies and it is the ambition of this invention to overcome these. In particular it would be advantageous to have a spade drill bit that has good cutting characteristics, that can be easily sharpened by the end user and is relatively easy to manufacture.

SUMMARY OF THE INVENTION

A spade drill bit for use in association with a drill having a direction of rotation includes an elongate shank, a spade portion and a centre spur. The elongate shank portion has a central longitudinal axis and one end adapted to engage the drill. The spade portion extends longitudinally from the other end of the elongate shank. The spade portion has opposed spaced apart planar faces and each planar face has a leading shoulder edge and a trailing shoulder edge. Each planar face has a leading face portion and a trailing face portion proximate to the respective leading shoulder edge and trailing shoulder edge that are twisted in the direction of rotation. The centre spur extends outwardly from the spade portion along the central longitudinal axis.

In another aspect of the invention, a spade drill bit includes an elongate shank, a spade portion and a centre spur. The elongate shank portion has a central longitudinal axis and one end adapted to engage the drill. The spade portion extends longitudinally from the other end of the elongate shank. The spade portion has opposed spaced apart planar faces. Each planar face has a leading face portion, a trailing face portion, a leading shoulder edge, a trailing shoulder edge, a leading longitudinal edge and a trailing longitudinal edge. There is a corner leading edge between the leading shoulder edge and the leading longitudinal edge. A dimple is formed in each leading face portion proximate to each corner leading edge such that a cutting edge is formed at each corner leading edge. A centre spur extends outwardly from the spade portion along the central longitudinal axis.

In a further aspect of the invention, a spade drill bit includes an elongate shank, a spade portion and a centre spur. The elongate shank portion has a central longitudinal axis and one end adapted to engage the drill. The spade portion extends longitudinally from the other end of the elongate shank. The centre spur extends outwardly from the spade portion along the central longitudinal axis. The centre spur has a pair of opposing centre spur faces. Each centre spur face has a centre spur leading edge and a centre spur trailing edge which meet at a point. A centre spur elongate flute is formed in each centre spur face proximate to the centre spur leading edge. The centre spur elongate flute has an inside boundary that is generally parallel to a central longitudinal axis such that the volume of the centre spur elongate flute increases as it approaches the spade portion.

Further features of the invention will be described or become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
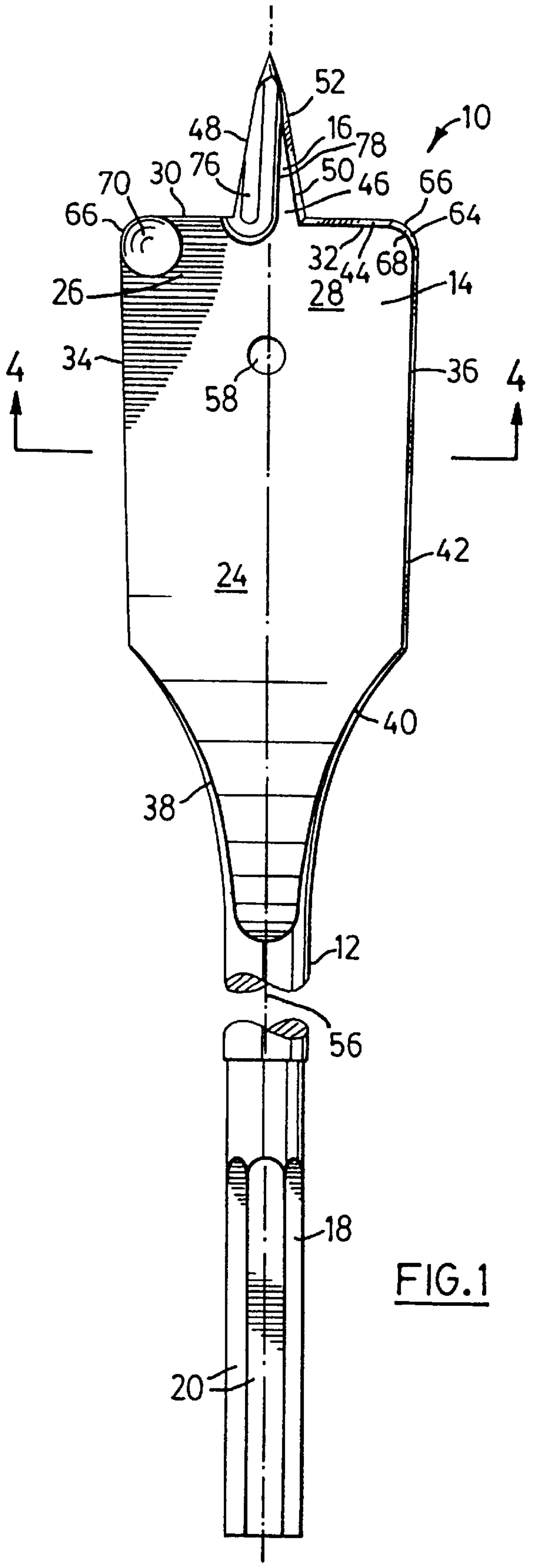
FIG. 1 is a front view of the spade drill bit constructed in accordance with the present invention.
Figure 2:
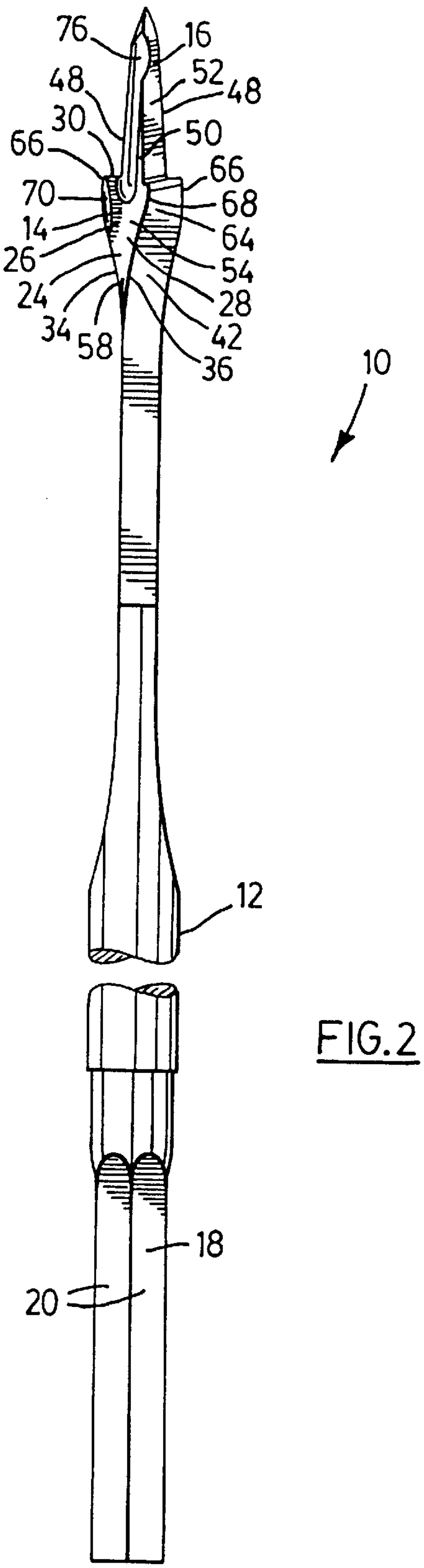
FIG. 2 is a side view of the spade drill bit of FIG. 1.

The spade drill bit of the present invention is a one piece forged steel spade drill bit for forming holes in wood or other similar material when used with an electric or cordless drill or drill press. Referring to FIGS. 1 and 2 the spade drill bit of the present invention is shown generally at 10. Spade drill bit 10 has an elongate shank portion 12, a spade portion 14 and a centre spur 16.

The driving end 18 of the elongate shank portion 12 has a plurality of flat sides 20. The flat sides 20 form a generally hexagonal shape in cross section. The driving end 18 facilitates engagement of the spade drill bit 10 in a chuck of an electric or cordless drill or drill press (not shown).

Spade portion 14 is wider than the elongate shank portion 12 due to the forging and flattening of the cylindrical bar. Spade portion 14 has two opposing generally planar faces 24 with each face 24 having a leading face portion 26 and a trailing face portion 28. Each face 24 is bounded by a leading shoulder edge 30, a trailing shoulder edge 32, a leading longitudinal edge 34, a trailing longitudinal edge 36, a leading shank edge 38, a trailing shank edge 40 and the centre spur 16. Longitudinal sides 42 join the leading longitudinal edge 34 of one face 24 with the trailing longitudinal edge 36 of the other face 24. Similarly, shoulder sides 44 join the leading shoulder edge 30 of one face 24 with the trailing shoulder edge 32 of the other face 24. The distance between faces 24 is relatively small as compared to the width of each face 24.

Figure 3:
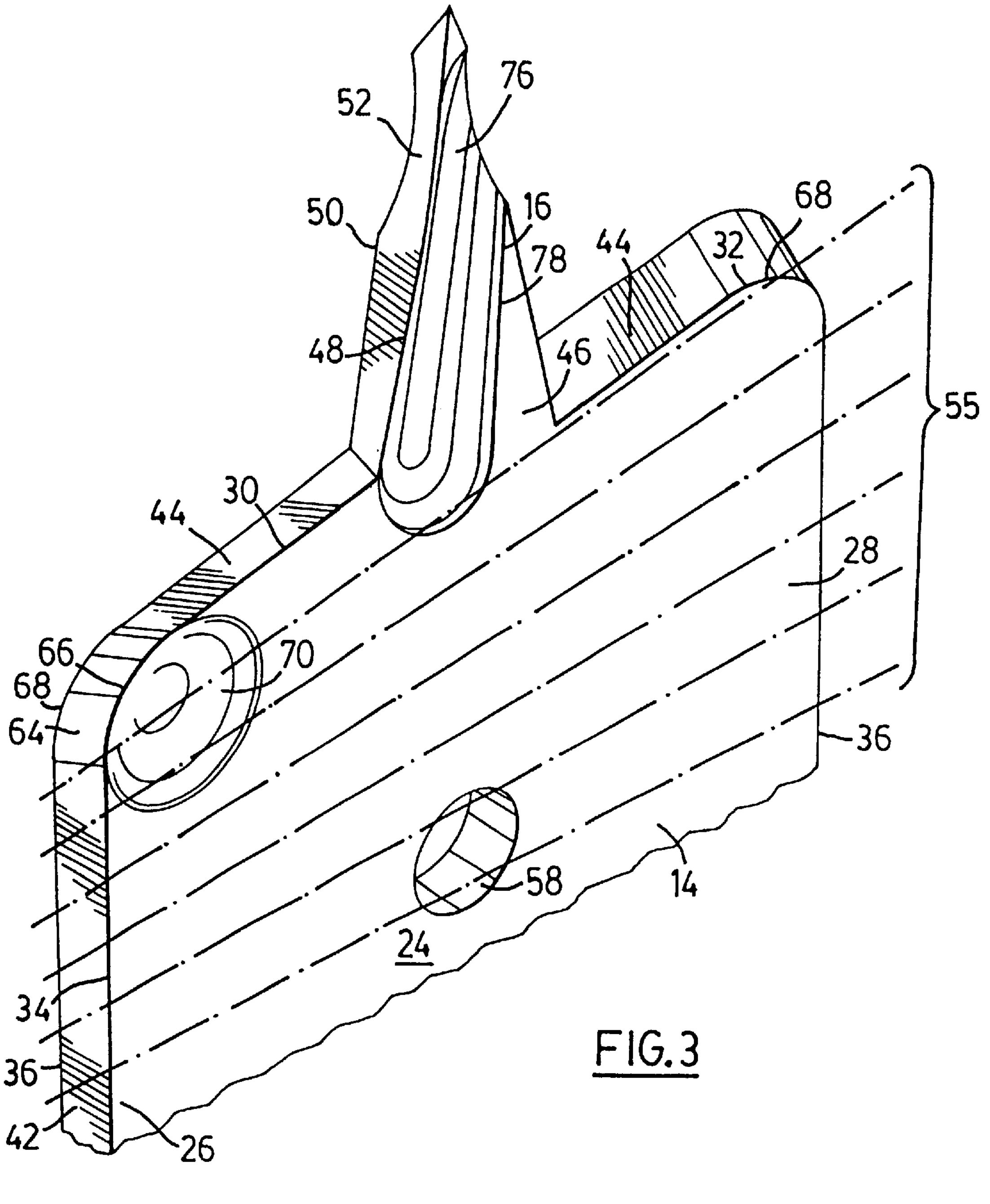
FIG. 3 is an enlarged partial perspective view of the spade portion of the spade drill bit of FIG. 1.
Figure 4:
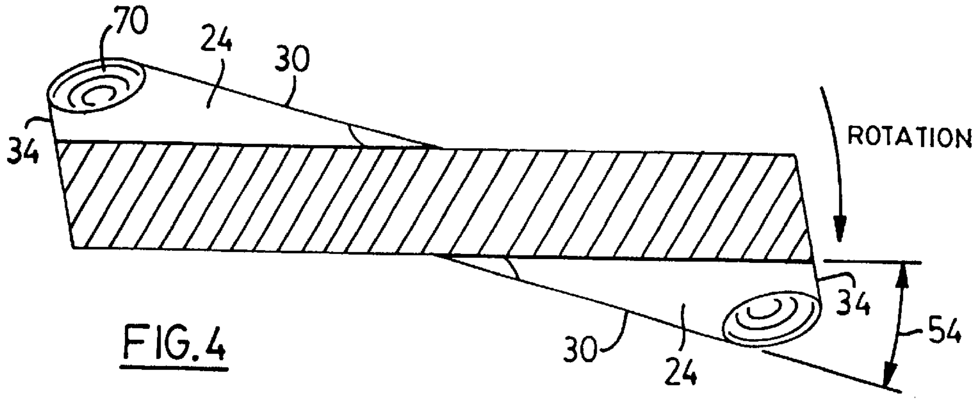
FIG. 4 is a cross section taken on line 4—4 of FIG. 1.

As shown in FIG. 3 the centre spur 16 has two oppositely facing generally planar centre spur faces 46 that are extensions of the faces 24. Each centre spur face 46 is bounded by the face 24 of the spade drill bit 10, by the centre spur leading edge 48 and the centre spur trailing edge 50. Centre spur sides 52 join the centre spur leading edge 48 of one centre spur face 46 with the centre spur trailing edge 50 of the other centre spur face 46.

Each leading shoulder edge 30, leading longitudinal edge 34 and centre spur leading edge 48 defines an acute angle between their respective sides 44. 42 and 52 and faces 26 and 46. Conversely, each trailing shoulder edge 32, trailing longitudinal edge 36 and centre spur trailing edge 50 defines an obtuse angle between their respective sides 44, 42 and 52 and faces 28 and 46.

Figure 5:
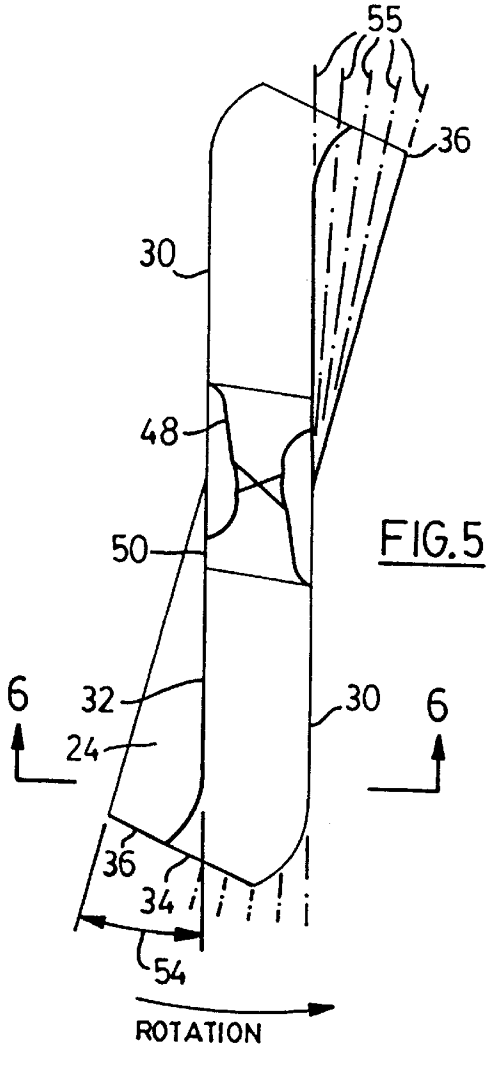
FIG. 5 is an end view of the spade drill bit of FIG. 1.
Figure 6:
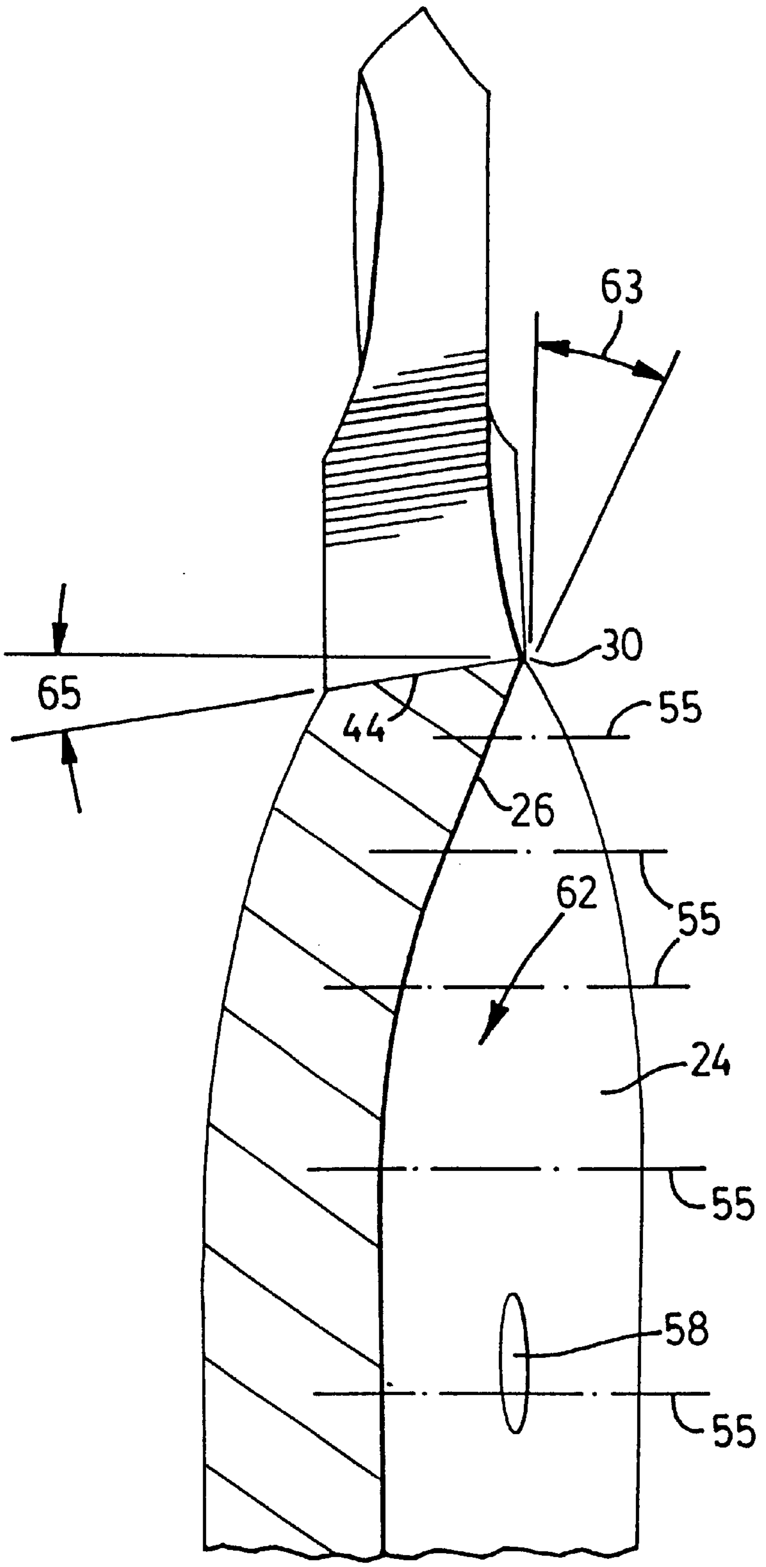
FIG. 6 is a cross section taken on line 6—6 of FIG. 5.

As shown in FIGS. 3, 4, 5 and 6, the portion of the planar face 24 adjacent to the leading shoulder edge 30 and trailing shoulder edge 32 has a right handed twist 54, in a smooth continuous curve in the direction of rotation. Spaced from the leading shoulder edge 30 and trailing shoulder edge 32, planar faces 24 are generally straight. Preferably twist 54 is arranged such that a straight line 55 perpendicular to the longitudinal axis 56 of the spade drill bit 10 and extending from a leading longitudinal edge 34 to the opposed trailing longitudinal edge 36 will be in continuous contact with the face 24. This line may be placed anywhere along longitudinal axis 56 along a planar face 24, as shown in FIGS. 3, 5 and 6.

Referring to FIG. 6, drill bit 10 has two relevant angles at the leading shoulder edge 30, namely a positive rake angle 63 and a relief angle 65. The positive rake angle 63 is the angle that the leading face portion 26 of the face 24 is swept backwardly from the vertical along the shoulder leading edge 30 and is formed by the twist 54 of the drill bit 10. The relief angle 65 is the angle that the shoulder side 44 is swept downwardly from the horizontal along the shoulder leading edge 30. The relief angle is formed by grinding the shoulder side 44 to the preselected angle.

Twist 54 provides each leading shoulder edge 30 with a positive rake 63 to allow a chip or "curl" of wood to form in the workpiece 60 (shown in FIG. 7) at the leading shoulder edge 30 during the operation of the spade drill bit 10. The "curl" or chip is suggested by the curved arrow 62 shown at the leading shoulder edge 30 in FIG. 6. The maximum amount of rake 63 for leading shoulder edge 30 provided by the twist 54 varies from one size of drill bit to the next size of drill bit, but ranges between 4° to 15°. The greater the rake 63 the greater the cutting efficiency but the greater the instability. For most applications a rake of 6° balances the efficiency with stability.

The relief angle 65 will also affect the stability of the drill bit 10. Similarly, the larger the relief angle 65 the larger the pull into the workpiece and the greater the instability. Thus to further balance the instability associated with the positive rake 63, the relief angle 65 can be selected to limit the maximum depth of cut of the drill bit 10 and so limit the maximum thickness of the resulting chip. By lowering the relief angle 65, the depth of cut and so the thickness of the chip is reduced and so the net cutting rate is maintained at a level that taxes neither the operator and the electric drill nor the strength of the drill bit 10 as a whole, while continuing to provide an acceptable cutting rate. Typically this angle will be between 5° and 10° and preferably relief angle is 6°.

Referring to FIG. 3, there is a gradual transition of the rounded corner 64 between shoulder side 44 and longitudinal side 42. The rounded corner leading edge 66 of the rounded corner 64 is a smooth continuous link between the leading shoulder edge 30 and leading longitudinal edge 34. Similarly, the rounded corner trailing edge 68 of the rounded corner 64 is a smooth continuous link between the trailing shoulder edge 32 and trailing longitudinal edge 36. The rounded corner trailing edge 68 has a smaller radius of curvature than the rounded corner leading edge 66 because of the acute and obtuse angles relative to longitudinal side 42 and shoulder side 44.

Figure 7:
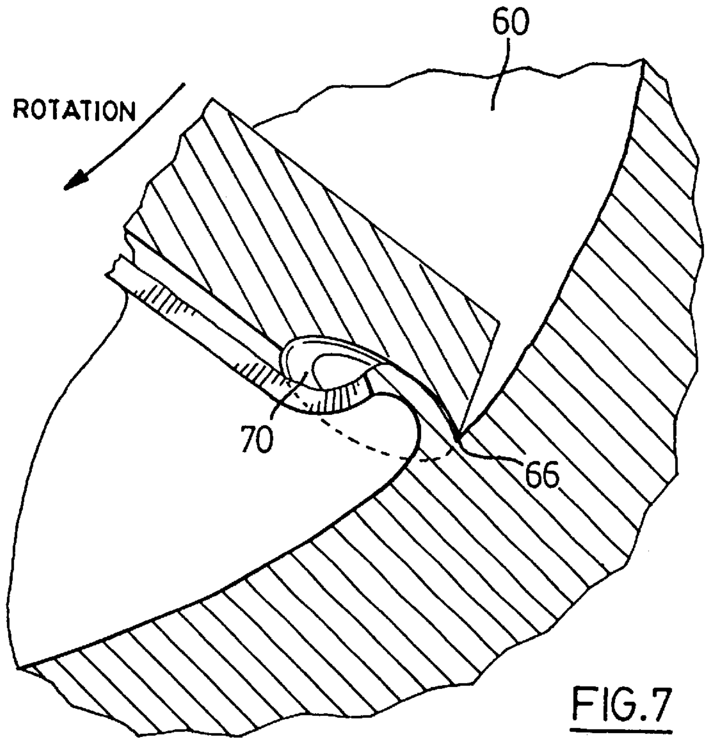
FIG. 7 is an enlarged cross section of a rounded corner and dimple of the present invention shown engaging a workpiece, also shown in cross section.
Figure 8:
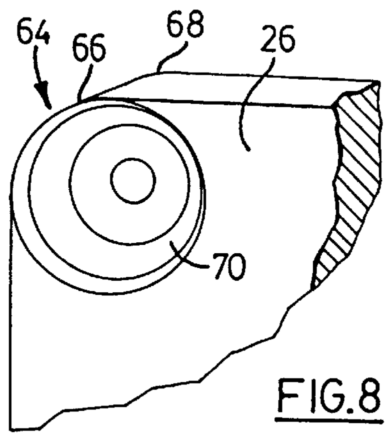
FIG. 8 is an enlarged partial perspective view of a rounded corner and dimple of the present invention.
Figure 9:
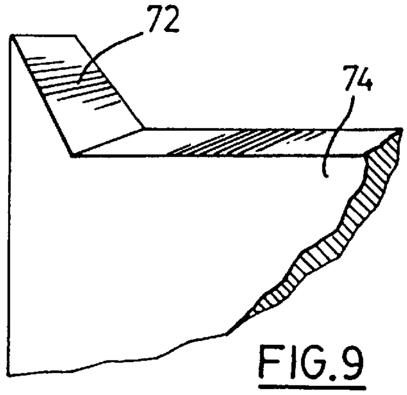
FIG.9 (PRIOR ART)
FIG. 9 Is an enlarged partial perspective view of a prior art side spur.

Referring to FIG. 3, a dimple 70 is positioned on the leading face portion 26 proximate to the rounded corner 64 such that rounded corner leading edge 66 forms a cutting edge. Dimple 70 is generally hemispherical in shape. A portion of dimple 70 is bounded by the rounded corner leading edge 66. Preferably dimple 70 has the same radius as the radius of the rounded corner 64. A cross section of the spade drill bit 10 through the dimple 70 and across the face 24 is shown in FIG. 7. As can be seen in FIG. 7, dimple 70 provides a positive rake to rounded corner leading edge 66. The rounded corner leading edge 66 and dimple 70 engages the work piece 60 and severs wood fibres therein. As shown in FIGS. 7 and 8, the cutting edge provided by the sharp rounded corner leading edge 66 between the rounded corner 64 and dimple 70 is an improvement over the cutting edge provided with a side spur 72 of prior art drill bit 74, shown in FIG. 9.

As best seen in FIG. 3, an elongate flute 76 is formed in centre spur face 46 proximate to the centre spur leading edge 48. Elongate flute 76 is narrower and shallower at the tip of the centre spur 16 than toward and into the face 24. An inside boundary 78 of the elongate flute 76 spaced from the centre spur leading edge 48 is generally parallel to longitudinal axis 56 of the spade drill bit 10. Elongate flute 76 in conjunction with centre spur leading edge 48 provides a positive rake angle to the centre spur leading edge 48. The centre spur 16 has an elongate flute 76 in each centre spur face 46. Accordingly the depth of each elongate flute 76 should not interfere with the other elongate flute 76 nor compromise the strength of the centre spur 16 as a whole.

Centre spur leading edge 48, leading shoulder edge 30, leading longitudinal edge 34 and rounded corner leading edge 66 are all sharpened edges. The centre spur leading edge 48 is field resharpened by use of a grinding stone or flat file, the stone or file being applied across the centre spur side 52, the new centre spur side 52 forming a new centre spur leading edge 48 in cooperation with the centre spur elongate flute 76. Similarly, the leading shoulder edge 30 is field resharpened by use of the same grinding stone or flat file, the stone or file being now applied across the shoulder side 44, the new shoulder side 44 forming a new leading shoulder edge 30 in cooperation with the twist 64 at the leading face portion 26. In addition, in continuation with the leading shoulder edge resharpening, the stone or file can easily be applied tangentially around the rounded corner 64, to form a new rounded corner leading edge 66 in cooperation with dimple 70. As the rounded corner leading edge 66 does not extend axially upwardly from the leading shoulder edge 30, a particularly narrow stone or file is not required to sharpen the leading shoulder edge 30 as is the case with prior art spade drill bits 74 that include side spurs 72 which limit the width of stone or file that can be used. Further, complex side spur geometry does not have to be preserved, beyond the rounded corner aspect, during resharpening the spade drill bit 10 of the present invention.

Figure 10:
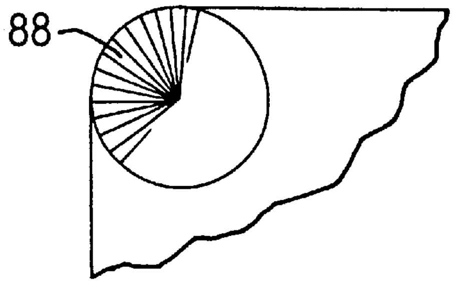
FIG. 10 is an enlarged front view of a conical dimple.
Figure 11:
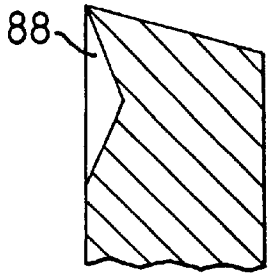
FIG. 11 is an enlarged cross section of the conical dimple of FIG. 10.
Figure 12:
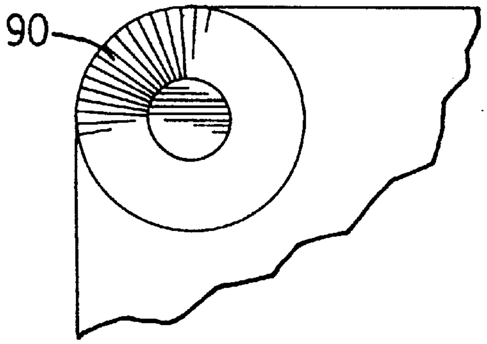
FIG. 12 is an enlarged front view of a frustoconical dimple.
Figure 13:
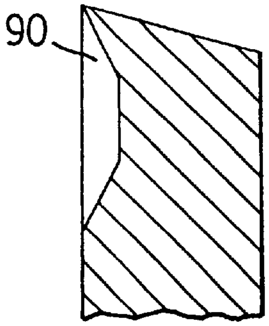
FIG. 13 is an enlarged cross section of the frustoconical dimple of FIG. 12.
Figure 14:
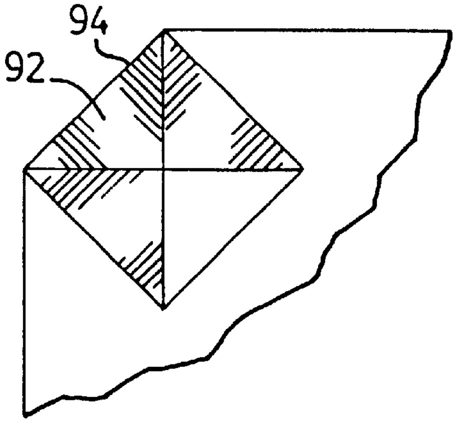
FIG. 14 is an enlarged front view of a pyramidal dimple.
Figure 15:
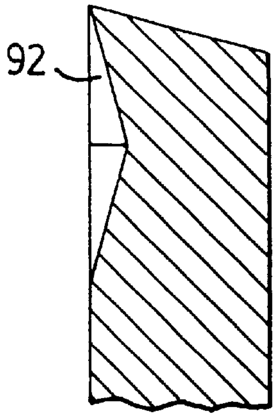
FIG. 15 is an enlarged cross section of the pyramidal dimple of FIG. 14.
Figure 16:
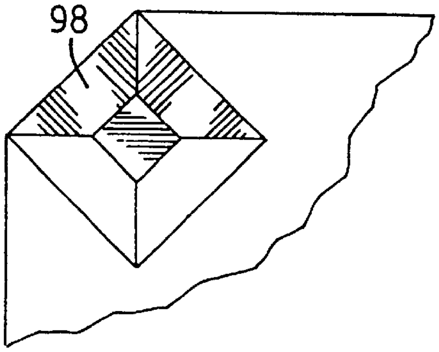
FIG. 16 is an enlarged front view of a frustopyramidal dimple.
Figure 17:
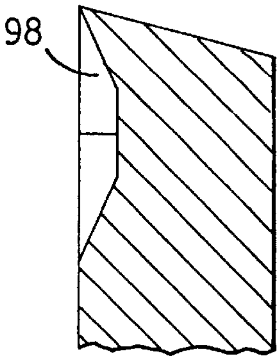
FIG. 17 is an enlarged cross section of the frustopyramidal dimple of FIG. 16.
Figure 18:
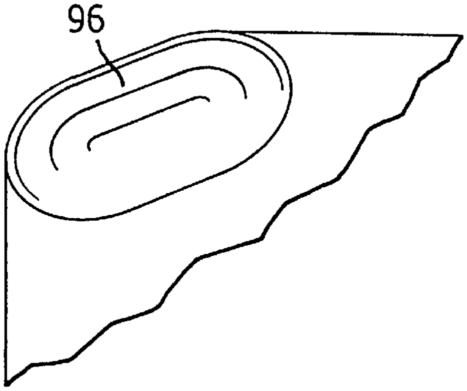
FIG. 18 is an enlarged front view of an elliptical dimple.
Figure 19:
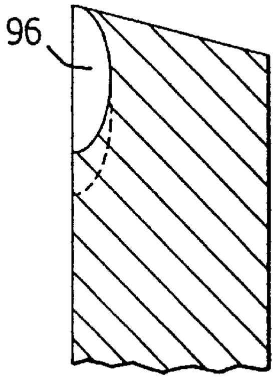
FIG. 19 Is an enlarged cross section of the elliptical dimple of FIG. 18.

Referring to FIGS. 10 through 19, the dimple could have a number of alternate shapes. The hemispheric dimple 70 described above has a spherical shape. Resharpening of the hemispheric dimple 70 will result in an erosion of the rounded corner leading edge 66 and a different rake of the rounded corner leading edge 66. FIGS. 10 and 11 show a conical dimple 88. The conical dimple 88 has a constant rake even after repeated sharpening. The frustoconical dimple 90 shown in FIGS. 12 and 13 is similar to the conical dimple 88 but limits the depth thereof. Similarly the frustoconical dimple 90 has a constant rake even after repeated sharpening. A pyramidal or diamond dimple 92 shown in FIGS. 14 and 15 has a straight corner leading edge 94. The pyramidal dimple 92 has a constant rake. Similarly frustopyramidal dimple 98 shown in FIGS. 16 and 17 has a straight corner leading edge with a limiting depth. The frustopyramidal dimple 98 has a constant rake. The elliptical dimple 96 shown in FIGS. 18 and 19 is similar to the hemispheric dimple 70 but has a longer rounded corner leading edge.

Figure 20:
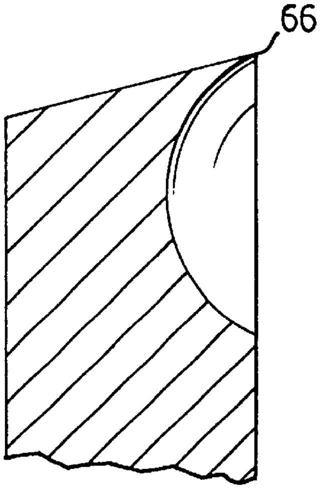
FIG. 20 Is an enlarged cross section of a hemispheric dimple showing a thin leading edge.
Figure 21:
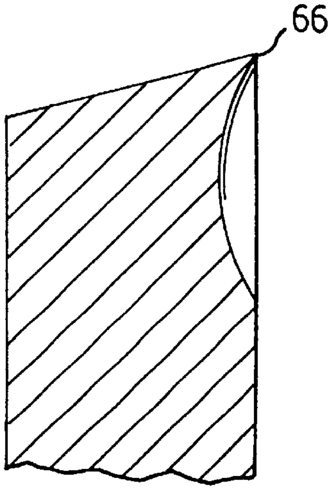
FIG. 21 is an enlarged cross section of a hemispheric dimple showing a thicker leading edge as compared to the leading edge shown in FIG. 20.

The shape and the rake of the dimple can be chosen by the manufacturer. However, it should be noted that if the shape and rake of the dimple is such that the leading edge is very sharp it is also very thin and very week and is subject to breakage and chipping when in use. An example of a dimple 70 with a sharp edge is shown in FIG. 20. Alternatively a dimple that balances the sharp edge with a relatively thick corner edge is shown in FIG. 21. The dimple of FIG. 21 is preferable over the dimple of FIG. 20.

Spade drill bit 10 is shaped using the forging process and thereafter grinding and sharpening. The spade portion 14 is forged by flattening a cylindrical bar of steel. The elongate shank portion 12 is the unmodified cylindrical bar. The flat sides 20 of the driving end 18 are ground or forged. Spade portion 14 is wider than the elongate shank portion 12 due to the forging and flattening of the cylindrical bar. The twist 54 is forged into the cylindrical bar with the spade portion 14 formed therein. A hole 58 is provided in the centre of planar faces 24. Hole 58 allows the end user to hang drill bit 10 for storage. Further hole 58 is used during the grinding and sharpening process to position the drill bit properly for each successive step of the manufacturing process.

Figure 22:
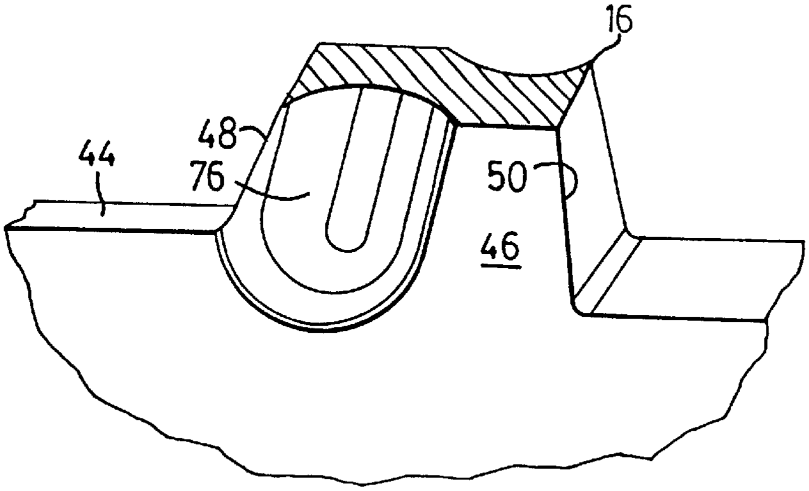
FIG. 22 is an enlarged partial cross section of a centre spur of the present invention.
Figure 23:
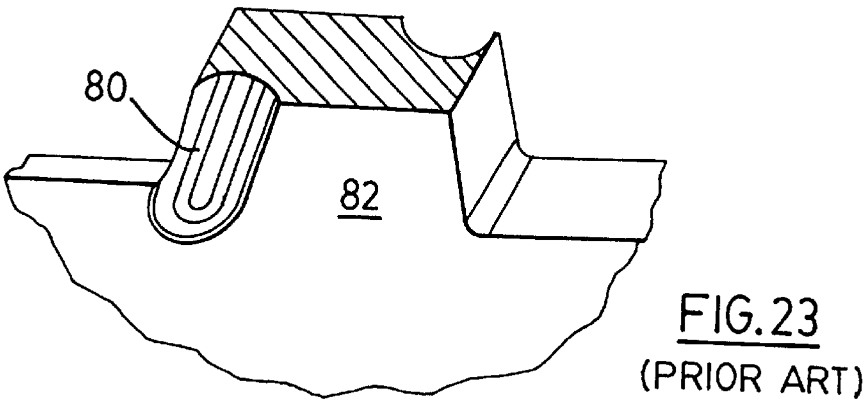
FIG. 23 (PRIOR ART)
FIG. 23 is an enlarged partial cross section of a prior art centre spur.
Figure 24:
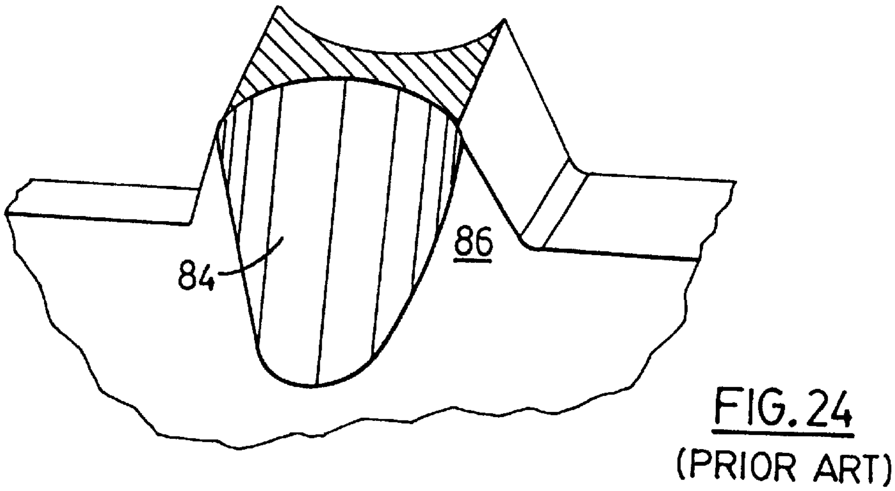
FIG. 24 (PRIOR ART)
FIG. 24 is an enlarged partial cross section of another prior art centre spur.

There are a number of advantages of spade drill bit 10 over the prior art. For example, while the provision of a centre spur elongate flute 80 of prior art drill bit 82 with both edges generally parallel to the centre spur leading edge has been shown (FIG. 23) the elongate centre spur flute 76 of the present invention provides increased efficiency by providing an increased volume as it approaches and enters the face 24, thereby providing the path for increased chip flow along the flute 76. Further, the elongate centre spur flute 76 of the present invention is an improvement over other centre spur flutes 84 of prior art drill bit 86 such as those shown in FIG. 24 because it has improved strength. A comparison of FIGS. 22, 23 and 24 suggests that the centre spur 16 and centre spur elongate flute 76 of the present invention have improved chip capacity and improved strength over the prior art while retaining a positive rake angle.

Further, although rounded corners have been shown in the prior art the provision of dimple 70 provides improved cutting characteristics. Overall, the spade drill bit 10 of the present invention has shown, through testing, improvements in the drilling rate and a reduction in the amount of wood splintering at the entrance and exit regions of the drill hole as compared to prior art drill bits.

It will be appreciated that the above description relates to the invention by way of example only. Many variations on the invention will be obvious to those skilled in the art and such obvious variations are within the scope of the invention as described herein whether or not expressly described.

What is claimed as the invention is:

1. A spade drill bit for use in association with a drill having a direction of rotation, comprising:

an elongate shank portion having a central longitudinal axis and one end adapted to engage the drill;

a spade portion extending longitudinally from the other end of the elongate shank, the spade portion having opposed spaced apart planar faces and each planar face having a leading face portion, a trailing face portion, a leading shoulder edges, a trailing shoulder edge, a leading longitudinal edge and a trailing longitudinal edge, the spade portion having a twist in the direction of rotation proximate to the leading shoulder edge and the trailing shoulder edge and the twist having a smooth continuous curve in the longitudinal direction and a rake angle of 6 degrees and the twist of each planar face being arranged such that a straight line perpendicular to the central longitudinal axis from the leading longitudinal edge to the opposed trailing longitudinal edge will be in continuous contact with the respective face; and a centre spur extending outwardly from the spade portion along the central longitudinal axis.

2. A spade drill bit for use in association with a drill having a direction of rotation, comprising:

an elongate shank portion having a central longitudinal axis and one end adapted to engage the drill;

a spade portion extending longitudinally from the other end of the elongate shank;

a centre spur extending outwardly from the spade portion along the central longitudinal axis the centre spur having a pair of opposing centre spur faces, each face having a centre spur leading edge and a centre spur trailing edge which meet at a point; and a centre spur elongate flute formed in each centre spur face proximate to the centre spur leading edge having an inside boundary that is generally parallel to central longitudinal axis such that the volume of the centre spur elongate flute increases as it approaches the spade portion.

3. A spade drill bit as claimed in claim 2 wherein each leading face portion and trailing face portion proximate to the respective leading shoulder edge and trailing shoulder edge is twisted in the direction of rotation.

4. A spade drill bit as claimed in claim 3 wherein there is a corner leading edge between the leading shoulder edge and the leading longitudinal edge and a corner trailing edge between the trailing shoulder edge and the trailing longitudinal edge and further including a dimple formed in each leading face portion proximate to each corner leading edge such that a cutting edge is formed at each corner leading edge.

5. A spade drill bit for use in association with a drill having a direction of rotation, comprising:

an elongate shank portion having a central longitudinal axis and one end adapted to engage the drill;

a spade portion extending longitudinally from the other end of the elongate shank, the spade portion having opposed spaced apart planar faces and each planar face having a leading face portion, a trailing face portion, a leading shoulder edge, a trailing shoulder edge, a leading longitudinal edge and a trailing longitudinal edge and wherein there is a corner leading edge between the leading shoulder edge and the leading longitudinal edge;

a dimple formed in each leading face portion proximate to each corner leading edge such that a cutting edge is formed at each corner leading edge; and a centre spur extending outwardly from the spade portion along the central longitudinal axis.

6. A spade drill bit as claimed in claim 5 wherein the dimple is generally hemispherical in shape and each rounded corner leading edge is generally curved.

7. A spade drill bit as claimed in claim 6 wherein each leading face portion and trailing face portion proximate to the respective leading shoulder edge and trailing shoulder edge is twisted in the direction of rotation.

8. A spade drill bit as claimed in claim 5 wherein the dimple is generally conical in shape and each corner leading edge is generally curved.

9. A spade drill bit as claimed in claim 8 wherein each leading face portion and trailing face portion proximate to the respective leading shoulder edge and trailing shoulder edge is twisted in the direction of rotation.

10. A spade drill bit as claimed in claim 5 wherein the dimple is generally frustoconical in shape and each corner leading edge is generally curved.

11. A spade drill bit as claimed in claim 10 wherein each leading face portion and trailing face portion proximate to the respective leading shoulder edge and trailing shoulder edge is twisted in the direction of rotation.

12. A spade drill bit as claimed in claim 5 wherein the dimple is generally pyramidal in shape and each corner leading edge is generally straight.

13. A spade drill bit as claimed in claim 12 wherein each leading face portion and trailing face portion proximate to the respective leading shoulder edge and trailing shoulder edge is twisted in the direction of rotation.

14. A spade drill bit as claimed in claim 5 wherein the dimple is generally frustopyramidal in shape and each corner leading edge is generally straight.

15. A spade drill bit as claimed in claim 14 wherein each leading face portion and trailing face portion proximate to the respective leading shoulder edge and trailing shoulder edge is twisted in the direction of rotation.

16. A spade drill bit as claimed in claim 5 wherein the dimple is generally elliptical in shape and each corner leading edge is generally curved.

17. A spade drill bit as claimed in claim 16 wherein each leading face portion and trailing face portion proximate to the respective leading shoulder edge and trailing shoulder edge is twisted in the direction of rotation.

18. A spade drill bit as claimed in claim 4 wherein the centre spur elongate flute extends into the blade portion.

19. A spade drill bit as claimed in claim 18 wherein the twist has a rake angle between 4 and 15 degrees.

20. A spade drill bit as claimed in claim 19 wherein the rake angle is 6 degrees.

21. A spade drill bit as claimed in claim 18 wherein the twist has a relief angle between 5 and 10 degrees.

22. A spade drill bit as claimed in claim 19 wherein the relief angle is 6 degrees.

* * * * *

UNITED STATES PATENT AND TRADEMARK OFFICE

CERTIFICATE OF CORRECTION

PATENT NO. : 6,227,774 B1
DATED : May 8, 2001
INVENTOR(S) : Keith Louis Haughton and Glenn Wallace Haughton It is certified that error appears in the above-identified patent and that said Letters Patent is hereby corrected as shown below:

Title page,
Item [73] Assignee: Mibro Partners, Scarborough (CA)

Signed and Sealed this

Twenty-eighth Day of August, 2001

*Attest:*

Nicholas P. Godici

NICHOLAS P. GODICI

*Attesting Officer* *Acting Director of the United States Patent and Trademark Office*